United States Patent [19]

Stewart

[11] Patent Number: 5,189,825
[45] Date of Patent: Mar. 2, 1993

[54] WEIGHTED WOBBLING LURE

[76] Inventor: John E. Stewart, 46 Crowder Circuit, Stirling Canberra 2611, Australia

[21] Appl. No.: 768,924

[22] Filed: Oct. 7, 1991

[30] Foreign Application Priority Data

May 11, 1989 [AU] Australia ................................ PJ4154
Nov. 23, 1989 [AU] Australia ................................ PJ7537
Apr. 18, 1990 [AU] Australia ............................ 53283/90

[51] Int. Cl.$^5$ ............................................. A01K 85/00
[52] U.S. Cl. ..................................... 43/42.03; 43/42.47
[58] Field of Search ................. 43/42.36, 42.45, 44.95, 43/42.44, 42.05, 42.15, 42.09, 42.06, 42.02, 42.03, 42.47; D22/126, 132, 133, 125

[56] References Cited

U.S. PATENT DOCUMENTS

| | | | |
|---|---|---|---|
| 552,012 | 12/1895 | Stanley | 43/42.45 |
| 966,068 | 8/1910 | Williamson | 43/42.15 |
| 2,696,694 | 12/1954 | Conder et al. | 43/42.48 |
| 2,769,271 | 11/1956 | Smith | 43/43.13 |
| 3,218,750 | 11/1965 | Lewin | 43/42.39 |
| 3,507,070 | 4/1970 | Rossello | 43/42.06 |
| 3,535,814 | 10/1970 | O'Brien | 43/42.06 |
| 3,555,717 | 1/1971 | Gautsche, Jr. | 43/42.39 |
| 3,628,276 | 12/1971 | Coalson | 43/42.36 |
| 4,245,421 | 1/1981 | Phillips | 43/42.47 |
| 4,777,761 | 10/1988 | Renaud | 43/42.47 |

Primary Examiner—Richard K. Seidel
Assistant Examiner—Jeanne M. Elpel

[57] ABSTRACT

A fishing lure comprising a body (1) which is adapted to provide means (11) for producing action and which is flexibly connected (9, 10) to a framework member (2) such that the body can exhibit action without the framework member having to move. The framework member has provision (5) for connection of the fishing line, includes a weight (6), and also may carry components such as hook(s) (12, 13), and fish and strike attractors which may have weight and/or water resistance that would dampen action if carried by the body. Hook(s) may be carried by the member, the body, or both. The flexible connection and the parts of the lure are adapted and arranged so that when the lure is drawn through the water, the body exhibits action without spinning and without the action being precluded by contact with the framework member or its attachments. A flexible connection may be used which allows only movement which is at least substantially limited to pivoting about a single pivotal axis, or about a combination of two pivotal axes. The lure may also be adapted to exhibit action as it is let sink in the water.

12 Claims, 3 Drawing Sheets

WEIGHTED WOBBLING LURE

TECHNICAL FIELD

This invention relates to a new type of fishing lure.

BACKGROUND ART

Many types of plugs currently in use, including crankbaits and minnow lures) wobble, swim, roll, or show other suitable 'in-built' action when drawn steadily through the water. Many of these types of plugs are retrieved by line connected to the body of the plug directly to an eyelet or through intermediate elements, and have one or more hooks connected to the plug body. In most cases, for the lure to achieve its action the lure body, hook(s) and line all have to move appropriately. Thus in these circumstances weight added to the line, intermediate elements, hook(s) or lure body will generally tend to dampen the action of these lures. Similarly, the addition to any of these components of fish and strike attracting elements such as propellors, flashes or spinning blades that add significant weight and/or water resistance will also tend to dampen action. These and related limitations restrict the effectiveness in certain fishing applications of many types of plugs with 'in-built' action currently in use. For example, many plugs with 'in-built' action that imitate very small bait fish, frogs or insects cannot be made heavier for more effective casting, and many larger plugs cannot be weighted for more effective deep water jigging or for longer distance casting, without impairing the plug's action. Furthermore, the addition of bait to artificial lures can often significantly improve their fish catching ability, provided the weight and/or water resistance of the bait does not impair the action of the lure. The significance of being able to retain satisfactory action in an artificial lure whilst also being able to add weight, bait and/or other components can be seen by examining the evolution of metal bladed lures: By the early 1800's, the metal spoon was in use in England and north America. It was discovered that the combination of bait with the spoon could improve catch rates in some circumstances, but this adversely affected the action. Around 1865 the spinner was invented, comprising a metal blade that rotated about a fixed shaft. Thus the fixed shaft could carry hooks, bait, weight and other components without impairing the action of the blade. The spinner is in widespread use today in a large variety of patterns and forms.

DISCLOSURE OF INVENTION

The main objects of this invention are to provide a fishing lure, particularly one with a plug-like lure body, which has 'in-built' action, other than action involving spinning of the lure body or of the lure as a whole, while also allowing: the inclusion in such a lure of increased weighting and the inclusion of other components such as snag and weed proofers and fish and strike attractors whose weight and/or water resistance may otherwise inhibit action; the elimination of the need to have action-inhibiting elements such as hooks and fishing line attached to the lure body of such a lure; the inclusion in the lure body of such a lure of a flexible tail that may also be replaceable; and allowing the adaption of such a lure so that it exhibits at least satisfactory action not only on being drawn through the water but also when it is let sink in the water.

The invention comprises a lure body that is adapted to provide means for producing action other than spinning when the lure is drawn through the water and a framework member which is connected to the lure body by means that allow the lure body to exhibit at least satisfactory action without the framework member having to move. Thus the framework member can remain fixed while the lure body exhibits action involving movement relative to the framework member. Therefore, without inhibiting this action, the framework member can carry components that would inhibit action if carried by the lure body. The framework member is connected to the fishing line includes a weight, and may carry other components that may have significant weight and/or encounter significant water resistance when the lure is in use, including hooking means, and fish and strike attractors. The means connecting the lure body and the framework member, the position and shape of the framework member and its attachments, and the position and shape of the lure body are all complementarily adapted as necessary so that when the lure is drawn through the water the lure body exhibits at least satisfactory action without spinning and without said action being precluded by contact with the framework member or its attachments.

The main significance of the invention is that in addition to allowing fishing lures that may have plug-like lure bodies and are able to exhibit at least satisfactory action, it allows, in combination with these features: very small lures to be made heavier for more effective casting; lures to be weighted for more effective deep water jigging, other deep water applications, long distance casting and more effective casting in windy conditions; sufficient weight to be added to give a rate of sinking that will enable a suitable lure to exhibit action when let sink in the water; suitable weighting of the lure so that it retains stability under high retrieval or trolling speeds; the addition of weight for other purposes; the addition of fish and strike attractors such as bait, suitable in-line spinners, flashes, scent dispensers, skirts, pork or plastic trailers and other lures in tandem or parallel; the elimination of the need for the lure body to carry hooks or to be connected to the line; the inclusion in the lure body of a suitable flexible tail that may also be replaceable; the addition of suitable snag and weed proofers; the addition of other components that improve the effectiveness of the lure; and allows restrictions on the freedom of movement of the line that draws the lure through the water e.g. restrictions caused by sinkers or other weight, other lures, wire trace, or bait.

The invention represents a new type of fishing lure that can be adapted in numerous ways for a wide range of fishing situations. Without limiting the generality of the above description of the invention, and without attempting to identify all the effective ways in which the invention can be achieved, the specification now outlines various embodiments and classes of embodiments of the invention, and various forms of some of the essential and non-essential elements of the invention.

The means for producing action when the lure is drawn through the water include the methods known to the art and those currently in use which produce 'in-built' action in plugs and other lures, and which will produce action other than spinning in the context of the invention. These include: a suitable bib suitably located in front of or behind the connection between the lure body and the framework member; a suitable shape of the lure body; a suitable flat or concave face on the lure body; and a suitable combination of these features. As in some lures currently in use, the effect of these features can be enhanced in suitable lures by an appropriate orientation of the lure body as it is drawn through the water that, for example, increases water pressure on the upper surface of the lure body. As is well known to the art, these features can also provide means to influence the depth at which the lure will operate when in use by serving as diving or surfacing planes actuated by water pressure as the lure is drawn through the water.

There are many known methods by which a suitable flexible connection between the framework member and the lure body can be provided, including mechanical connections and those that use flexible material. An important class of mechanical connections are pivotal connections. There are many known ways to achieve these. For example, a connection which allows pivoting of the lure body about a single axis can be achieved by an arrangement whereby a suitably adapted part of the framework member is movably received in a suitable aperture provided in the lure body, or whereby a suitably adapted part of the lure body is movably received in a suitable aperture in the framework member. For example, in a suitable embodiment the pivotal axis can be in a transverse plane of the lure body, see the embodiment illustrated in FIG. 7 of the drawings where the pivotal axis is vertical in a transverse plane, or can be parallel to the longitudinal axis of the lure body, or can be in the lure body and can be resolvable into a transverse component and a longitudinal component&x or can coincide with the longitudinal axis of the framework member. By being able to pivot to and fro about a single, vertical pivotal axis a lure body in a suitable lure will be able to exhibit the side to side pivoting action common in many plugs with 'in-built' action currently in use. A connection which allows pivoting about a combination of two pivotal axes can be achieved through an arrangement whereby a separate element is separately pivotally connected to part of the lure body and to part of the framework member, where each pivotal connection allows pivoting about a single axis. For example, in a suitable embodiment one pivotal axis can be parallel to the longitudinal axis of the lure body and the other lengthwise in a shaft portion of the framework member, see the embodiment illustrated in FIGS. 4, 5, and 6 of the drawings, or one axis can be in a transverse plane of the lure body and the other coincide with the longitudinal axis of the framework member for example, in a suitable embodiment of the invention, one end of an element can be adapted to provide a suitable shaft portion which is movably received in a vertical aperture in the lure body while the other end provides a suitable aperture which movably receives a suitably adapted part of the framework member whose long axis is normal to the long axis of both the element and the aperture in the lure body. A pivotal connection can also be achieved with a ball and socket joint with the extent of the pivoting controlled by one or more abutments or other adaptions of the joint. Two particularly important classes of the invention are where the movement of the lure body relative to the framework member allowed by the connection and any movement-limitation means is restricted at least substantially to either: pivoting about a single axis; or pivoting about a combination of two pivotal axes. The pivotal axes may be in any part of the lure, including in the framework member. The pivotal connections of these two classes of the invention may be loosely made in order to allow 'jiggly' movement about the connection. The significance of these two classes of the invention which both involve substantial restriction of the possible forms of relative movement of the framework member and the lure body is that: the restriction excludes a wide range of relative movement that would result in inappropriate interaction of the framework member and the lure body; the range of pivotal movements allowed by these two types of connections include very effective fish and strike attracting action; and movements that do not represent good action and/or may result in the lure body tending to 'stick' in the one position or may result in destabilisation of the lure are not allowed by the connections or can be easily excluded by movement-limitation means. For similar reasons, an important class of flexible connections are those where the movement permitted by the connection and any movement-limitation means is restricted at least substantially to pivoting action, as distinct from translational action whereby the lure as a whole moves relative to the framework member. A significant class of the invention is where the flexible connection and any movement-limitation means not only allow appropriate relative movement between the lure body and the framework member, but also preclude inappropriate movement.

In embodiments of the invention where the action of the lure body includes at least wobbling, if the connection means are located sufficiently near the front end of the lure body, interaction with the water alone will cause the front end of the lure body to tend to face the front and wobble when the lure is drawn through the water. In this specification and in the claims 'wobbling' refers to pivoting to and fro arising from the transverse component (if any) of a pivotal axis, as distinct from 'rolling' which refers to pivoting to and fro which arises from the longitudinal component (if any) of a pivotal axis. Therefore, where there is a single pivotal axis and it lies wholly in a transverse plane of the lure body, action is limited to wobbling. A transverse plane is a plane perpendicular to the longitudinal axis of the lure). Where this axis is horizontal and parallel to the lure's longitudinal axis , action is limited to rolling. An axis intermediate to these can be considered to have a transverse and a longitudinal component, and it will give rise to action that combines rolling with wobbling. Where, however, the connection is not located sufficiently far forward, the extent of pivoting allowed the lure body should be limited sufficiently to ensure that the front end of the lure body faces the front and wobbles when the lure is drawn through the water. If the extent of pivoting is not sufficiently limited, the lure body will not tend to face the front, may turn side-on to the direction of movement, may reverse the direction it faces, and/or may 'stick' in the one position. Movement-limitation means can be used for this purpose, and also may be used in any lure in order to limit the action or otherwise limit the extent of the movement of the lure body relative to the framework member. This can aid effective casting, exclude inappropriate relative movement of the lure body and the framework member, and control the movement of the lure body for effective use of the lure. Movement-limitation means are generally achieved by arranging parts of the lure body and the framework member so that they come into contact when the pivoting or other movement would otherwise occur beyond the extent desired. Part(s) of the flexible connection means may also be used. Parts of the framework member and/or the lure body and/or any parts of the flexible connection means can be specifically formed and adapted to perform this function. For example, a projection of the lure body can move between the ends of a channel formed in the weight means, or a projection of the framework member, including a projection of the weight means, can similarly interact with the lure body; the movement of the lure body can be arrested when pins or other projections fixed to it meet the framework member or vice versa; part of the framework member which is received in a recess or an aperture in the lure body can come in contact with the sides of the recess or aperture; and so on. These parts that comprise the pivotal limitation means may also be adapted to produce fish attracting sounds when they repeatedly come into contact with one another.

A preferred form of the invention is where the flexible connection is located so that part of the lure body is in front of the connection and part behind. Therefore when the lure body wobbles, the front part moves one way, and the rear part the other, thus resulting in a more realistic swimming action.

A very significant class of the invention is where the fish hook means are carried by the framework member. This is significant not only because the arrangement saves the lure body from the action-inhibiting effects of carrying hooks, but also because the hooks can carry bait without destroying the action of the lure; the combination of bait and a plug-like lure with 'in-built' action is very effective in many situations. In addition, the arrangement allows the lure body to include a suitable, flexible, replaceable tail portion, by relieving it of the need to carry hooks, allows the hook(s) to carry pork, plastic or other trailers, and allows the hook(s) to be fixed immovably to the lure. In many current plugs with 'in-built' action, fixed hooks or trailers on the hooks would tend to dampen action. Although it is a significantly less effective arrangement for many applications, the inventions still covers embodiments where the fish hooking means are carried by the lure body because I believe that when combined with other features of the invention such as weight means carried by the framework member, these types of lures have significant advantages over the prior art in some fishing applications.

The framework member can be slidably mounted on the fishing line or on a hook and line connector. The hooking means is connected to the line or to the connector to allow the framework member and the lure body to move away from the hooking means particularly when a fish is hooked.

The combination of sufficient weight with 'in-built' action in a plug-like lure is very beneficial in many fishing situations. A very important sub-class of the invention' is where the weight means are sufficiently heavy to cause the lure to sink, when it is not being drawn through the water, at a rate that will actuate at least one suitable action-producing feature. The weighting of the member can be distributed so as to ensure a general orientation of the lure as it sinks that best actuates the action-producing feature(s). In a suitable arrangement the action can be produced by the same feature(s) that produce action when the lure is drawn through the water. The action can also be supplemented by or produced by one or more additional features that can produce action in this context. These include suitable features that utilize the principles that cause action in lures when they are drawn through the water, and also include suitable features that utilize the principles that cause action in lures such as tin squids, spoons and metal jigs when they are let sink. The member and the weight means can also be adapted and shaped to assist in producing action in the lure when it is drawn through the water or let sink. Where the weighting is added to the member at the front of the lure, the weighting can be shaped in a suitable embodiment of the lure to produce many of the same kinds of effects as are produced by the various kinds of shapes of jig heads currently in use or known to the art. The distribution and form of the weighting of the member may also be designed to facilitate casting, to assist in producing a desired orientation of the lure when it is drawn through the water and/or to act as a keel to stabilize the lure, including at high retrieval and trolling speeds. The keel effect can be assisted by a suitable shape and positioning of the member. The amount and arrangement of the weighting can also assist in determining the depth at which the lure works when in use. This can also be influenced by the incorporation in the member of suitable features that act as a diving or surfacing plane. These features can also influence the orientation of the lure in use.

In a suitable embodiment of the invention the weight means may be received in a recess in the lure body. The shape and the position of the weight means and the recess are complementarily adapted so that they do not inappropriately interact when the lure body exhibits action. Other parts of the framework member may also be received in recesses or apertures in the lure body, with similar complementary adaption. These arrangements allow the lure to be made more streamlined and fish-like.

The lure body can be a suitable plug-like body and can include suitable versions of the fish and strike attracting features known to the art or currently in use for plugs with 'in-built' action, including means to produce rattling or other noise. The lure body can also to an appropriate extent include flexible materials. A particularly effective class of embodiments where the hook means are carried by the framework member involves a lure body with a suitable replaceable flexible tail, such as a soft plastic eel-like, worm-like, or fish-like tail. The lure body can also include an appropriate arrangement of the types of materials used to make up the tails of jigs and to tie flys.

Suitable snag and weed proofing arrangements can be included in the framework member. These include the arrangements that suitably use the principles applied in arrangements known to the art or currently in use in lures, such as weed guards and deflectors, skirts, and arrangements that ensure that the hooks ride with the point uppermost when the lure is drawn through the water, thus one or more hooks can be immovably fixed to the framework member, or formed as part of the member. Similar principles can be used where appropriate to reduce the frequency of the line fouling the hooks or the member when the lure is in use. A particular advantage of the invention is that weed and snag proofing arrangements can be used that would tend to dampen action in many current plugs with 'in-built' action.

The framework member may be adapted to provide means to engage un-snagging devices such as those that are let slide down the line when the lure becomes snagged, are retrieved by a heavy breaking-strain line (e.g. cord), and are used to drag the lure free when they have engaged it. The engagement means may be a suitable protrusion of the member that the unsnagging device slips easily over when it is let slide down the line, but which the device hooks onto when it is retrieved.

The framework member may also be adapted to carry electrical components that may, for example, provide suitable means for producing light(s), constant or flashing or means for producing suitable movement including appropriate vibrations. Again, components may be carried that would tend to dampen action in many current plugs with 'in-built' action.

The framework member may include or have attached to it one or more fish and strike attractors such as a suitable in-line spinner; a pork, plastic or other trailer; a propellor; a flasher spoon; another type of flasher; means for holding bait; light producing means; and means for holding and dispensing fish attracting scent. The hooks may also be fitted with suitable fish and strike attractors. Some of these additional components, such as an in-line spinner, can also be suitably used to influence the depth and speed at which the lure operates effectively. Where appropriate, one or more suitable fish and strike attractors or other lures may be suitably fitted in tandem or in parallel to the lure body, held by suitable adaptions of the member or additions to the member. An example of a parallel arrangement is a spinnerbait where the arm of the spinnerbait which rides lowermost in the water during retrieval is the framework member to which the lure body is attached. The framework member is adapted to provide the upper arm of the spinnerbait arm which holds one or more attractors in parallel to the lure body.

BRIEF DESCRIPTION OF THE DRAWINGS

A number of particular embodiments of the invention will now be described with reference to the accompanying drawings.

BEST MODE OF CARRYING OUT THE INVENTION

Figure 1:
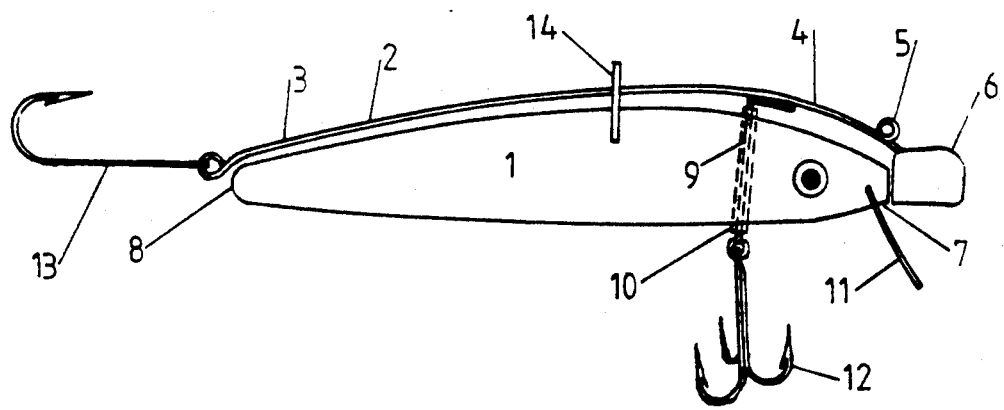
FIG. 1 is a side elevation view of a fishing lure in accordance with the best mode known to me for carrying out the invention.
Figure 2:
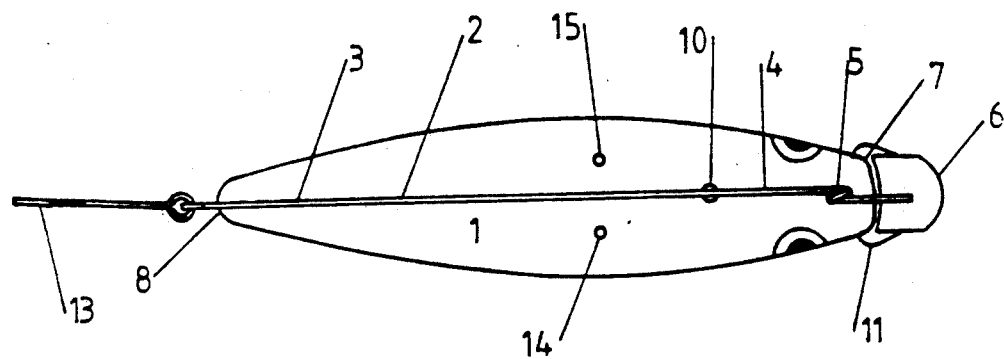
FIG. 2 is a top plan view of the embodiment of FIG. 1.
Figure 3:
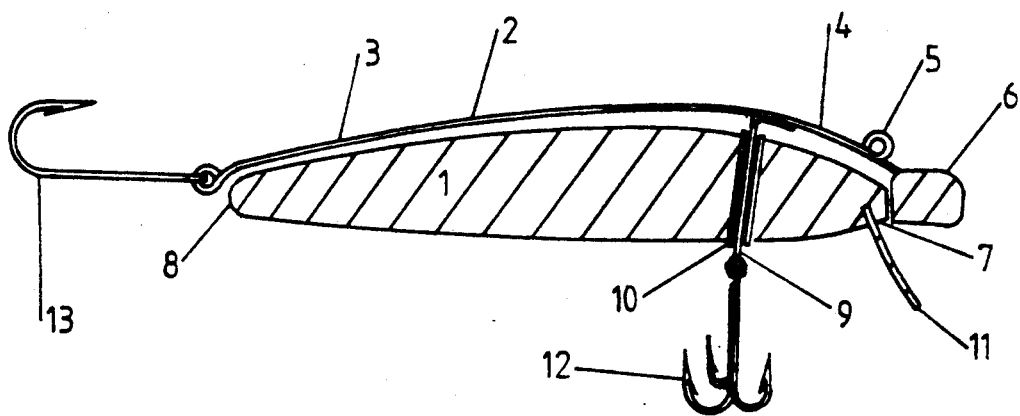
FIG. 3 is a side sectional view of the embodiment of FIG. 1, taken along the longitudinal axis of the lure.

The specification will now refer to the drawings in detail and initially to FIGS. 1, 2 and 3 which show an embodiment of the best mode known to me for carrying out the invention: The lure body I is flexibly connected to the framework member 2 by means which consist of a cylindrical shaft portion 9 of the framework member 2 which is movably received in a metal tube 10. The metal tube 10 is immovably fixed to the lure body 1. The lure body 1 is held in place on the shaft portion 9 by the loop formed in the bottom of the shaft portion 9, which loop holds the hook 12. This arrangement allows the lure body 1 to pivot about the shaft portion 9.[In embodiments in which the lure body 1 is formed of a material which is sufficiently hard and strong, the metal tube 10 can be dispensed with, and the shaft portion 9 can be received in an aperture provided directly in the material of the lure body itself. For example, where the lure body is formed of suitable molded plastic halves fixed together along a central longitudinal seam.]The extent of the pivoting action is limited by the pins 14 and 15 when they come into contact with the framework member 2. The pins 14 and 15 are immovably fixed to the lure body 1. The flexible connection is located sufficiently forward along the lure body 1 that when the lure is drawn through the water, water pressure alone will cause the front end 7 of the lure body 1 to face the front and wobble. The bib 11 is fixed immovably in the lure body 1. The portion 3 of the framework member 2 extends rearward of the flexible connection, and its end is formed into a loop which holds the hook 13. The portion 4 of the framework member 2 extends forward of the flexible connection. It includes the weight means 6 and is formed into the loop 5 to provide line connection means. The framework member 2 is formed of stainless steel wire which is at least sufficiently rigid to retain its overall shape during the casting and retrieval of the lure. It may, however, be resilient enough to flex and vibrate somewhat with the action of the lure body. The weight means 6 is a lead element fixed immovably to the framework member wire. When the lure is drawn through the water by fishing line connected to the loop 5, the effect of the weight 6 and the water pressure on the bib 11 will tend to cause the front end 7 of the lure body 1 to ride lower relative to the direction of movement than the rear end 8. This will result in the upper surface of the lure body 1 moving at an angle to the direction of movement of the lure. This increased water pressure on the upper surface of the lure body 1 will enhance the action of the lure body initiated by the bib 11. The lure body 1 will pivot rapidly to and fro about a single pivotal axis which passes vertically through the shaft portion 9 of the framework member 2. The framework member 2 and the weight 6 are spaced from the lure body 1 and are formed and arranged sc that the lure body 1 is not precluded from exhibiting its action by contact between them. The bib 11 will also act as a diving plane as will the upper surface of the lure body. The weight 6 is sufficiently heavy so that when the lure is let sink in the water the weight 6 will lead the lure as it sinks toward the bottom and the lure will sink at a sufficient rate to cause the bib 11 to initiate action of the lure body. Any type of suitable hook known to the art may be used in lieu of the hooks illustrated, and they may be connected to the framework member 2 by any suitable arrangement known to the art including by suitable intermediate elements.

The same reference numbers as used in FIGS. 1, 2 and 3 have been used for comparable structures in all the other figures.

Figure 4:
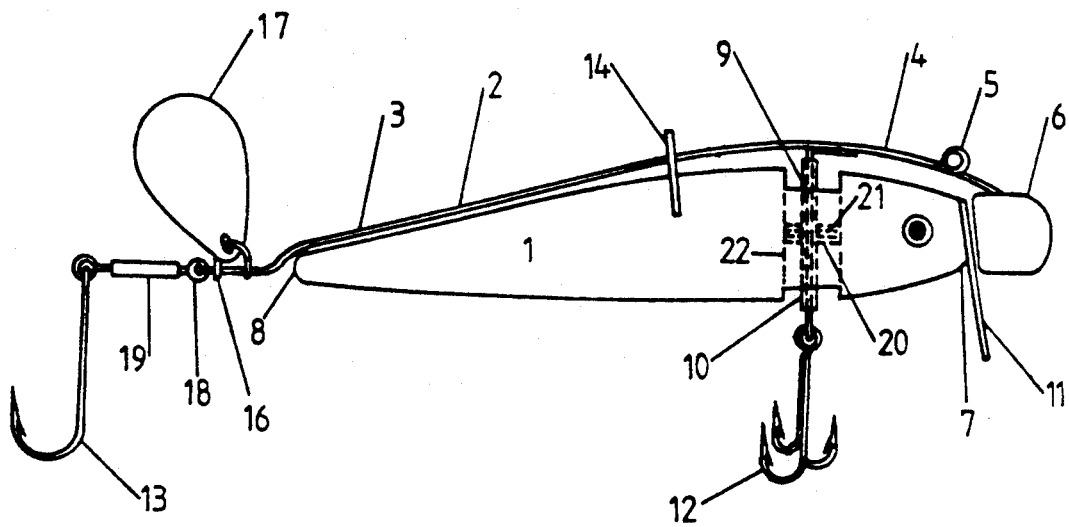
FIG. 4 is a side elevation view of a second embodiment of the invention.
Figure 5:
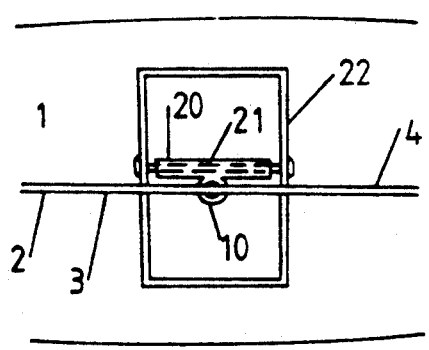
FIG. 5 is a top plan view of the connection between the lure body and the framework member of the second embodiment.
Figure 6:
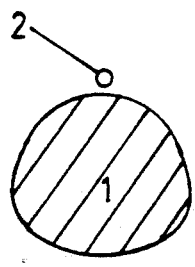
FIG. 6 is a transverse section taken immediately behind the pin 14 in FIG. 4.

FIGS. 4, 5 and 6 illustrate a second embodiment of the invention. It differs from the first embodiment mainly in that it includes a spinner and in that the flexible connection allows pivoting about a combination of two pivotal axes. A spinner blade 17 is rotatably mounted through a clevis 16 on the framework member 2 in tandem with the lure body 1. A bead 18 and a tube 19 are used to space the spinner from the hook 13. When the lure moves at a sufficient speed through the water either by being drawn by fishing line or by sinking, the blade 17 will spin around the framework member 2. The flexible connection includes a cylindrical shaft portion 9 of the framework member 2 which is movably received in a metal tube 10. The metal tube 10 is in turn pivotally connected to the lure body 1. This pivotal connection consists of a metal axle element 21 which is immovably fixed at either end to a hollow metal box 22 which is open at the top and bottom, which provides a housing for the components of the connection and which is immovably fixed to the lure body 1 in a suitable recess. The axle 21 is movably received in a metal tube 20 which is immovably fixed to the metal tube 9. Thus the lure body 1 can roll about a pivotal axis which passes lengthwise through the axle element 21, and can wobble about a pivotal axis which passes lengthwise through the shaft portion 9. Contact between the metal tube 10 and the sides of the metal housing 22 as the lure body 1 rolls from side to side limits the extent of this rolling action.

Figure 7:
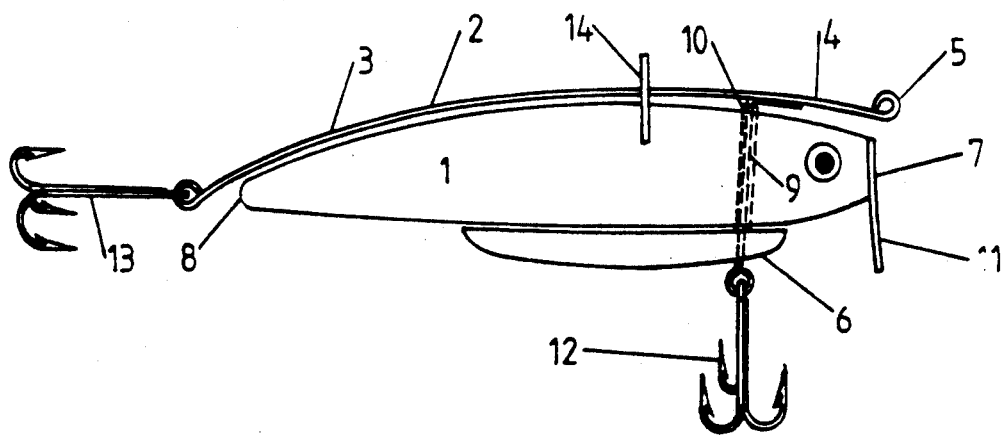
FIG. 7 is a side elevation view of a third embodiment of the invention.

FIG. 7 illustrates a third embodiment of the invention. Its main difference to the first embodiment is that the weight 6 is located under the lure body 1, immovably fixed to the lower part of the shaft portion 9 of the framework member 2. The weight 6 is distributed so that when the lure is let sink in the water the lure's orientation is near horizontal. The weight 6 is heavy enough to cause the lure to sink at sufficient rate so that the water pressure on the lower surface of the lure body 1, supplemented by the effect of the bib 11 results in the lure body 1 wobbling as it sinks. The lure body is wider than it is deep in order to enhance this effect.

Figure 8:
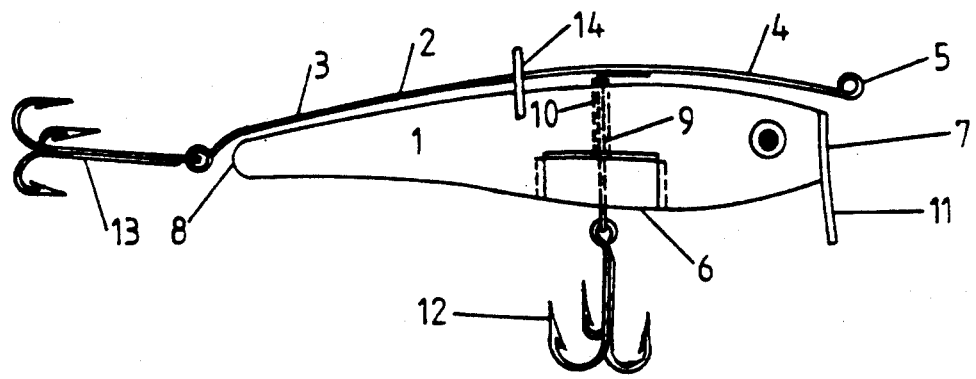
FIG. 8 is a side elevation view of a fourth embodiment of the invention.

FIG. 8 illustrates a fourth embodiment of the invention. It differs from all other embodiments illustrated in that the flexible connection is not located sufficiently forward along the lure body 1 that water pressure alone will cause the front end 7 to face the front and wobble when the lure is drawn through the water. Thus the pins 14 and 15 fixed immovably to the lure body 1 are required to sufficiently constrain the extent of pivoting so that the lure body will face the front and wobble. In this embodiment the pins 14 and 15 are located so as to limit the pivoting to an arc of 15 degrees. The other main difference to the embodiment illustrated in FIG. 7 is that the weight 6 is received in a recess in the lure body 1. The weight 6 has a cylindrical shape, except where its lower end is shaped to merge with the shape of the lure body 1, and the recess in the lure body 1 is complementarily shaped so that the lure body 1 can pivot about the weight 6 without contact between the two.

Figure 9:
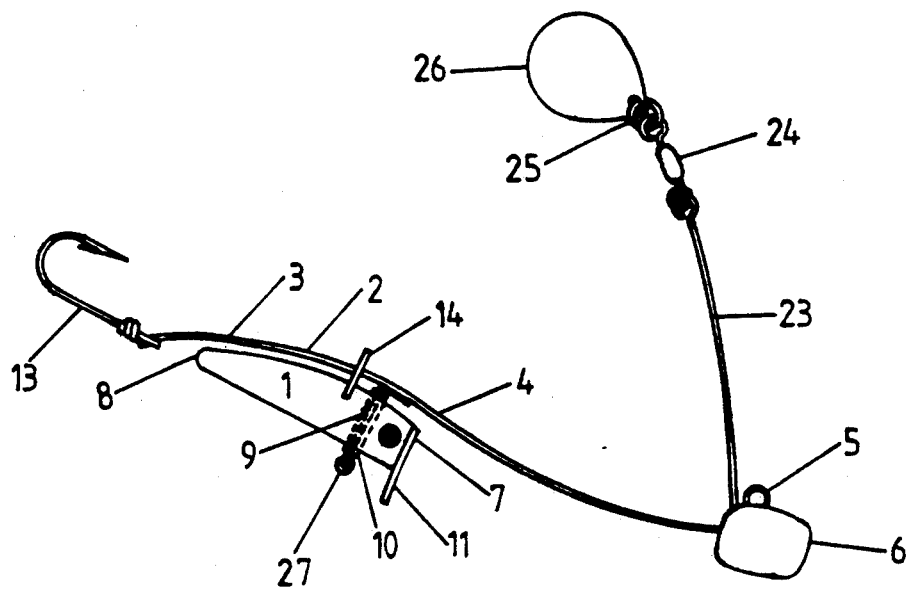
FIG. 9 is a side elevation view of a fifth embodiment of the invention.

FIG. 9 illustrates a fifth embodiment of the lure. It is a spinnerbait configuration. It differs from the other embodiments in that: the framework member 2 has an upper arm 23 to which a spinner blade 26 is rotatably connected by a ring 25 and a swivel 24; the hook 13 is fixed immovably to the framework member 2 so that the hook point rides uppermost to reduce the likelihood of snagging weeds or other objects; there is no hook connected to the loop 27 in the bottom of the shaft portion 9 of the framework member 2; and the weight 6 is immovably fixed to the framework member 2 some distance in front of the lure body 1 so that when the lure is drawn through the water, the weight 6 will be lower than the lure body 1 relative to the direction of movement of the lure, thus causing the upper surface of the lure body 1 to move through the water at an angle, thus enhancing the action of the lure body 1.

It will be understood that the embodiments of the invention described herein are illustrative only, and do not limit the scope of the invention. There are many ways known to the art or obvious to those skilled in the art to give effect to the features described herein or to use the essence of the invention to provide fishing lures to suit many particular fishing situations.

The claims defining the invention are as follows:

1. A fishing lure comprising:
   a lure body having a front end, a rear end, and a longitudinal axis;
   a framework member generally parallel to said longitudinal axis of said lure body, said framework member including a line connection means;
   pivot means attaching said framework member to said lure body rearward of said lure body font end;
   a weight member having a rear end and a front end, said weight member attached to said framework member, wherein said weight member is suspended forward of said lure body front end, and said line connection means located rearward and spaced from said weight member front end, and forward of said pivot means;
   an action producing means comprising a bib attached to said lure body forward of said pivot means, and
   a fish hooking means connected to said fishing lure; whereby said lure wobbles in an oscillating action when drawn through a body of water, said wobble action caused by a reaction force of the water on said action producing means which causes the lure body to pivot about said pivot means, and said water reaction force alternately acting on said lure body rearward of said pivot means causing said body to realign with the direction in which the lure is being drawn through the water, and said weight member stabilizing said framework member form longitudinal rotation and lateral movement when said lure is drawn through the water.

2. The fishing lure of claim 1 wherein said pivot means includes a bore in said lure body generally transverse to said lure body longitudinal axis and rearward of said lure body front end, and includes a shaft connected to said framework member, and said shaft pivotably inserted in said bore rearward of said lure body front end.

3. The fishing lure of claim 2 further comprising; a movement limitation means for limiting the movement of said lure body with respect to said framework member.

4. The fishing lure of claim 2 further comprising a longitudinal axis pivoting connection for said shaft.

5. The fishing lure of claim 2 wherein said shaft is restricted to a single transverse axis.

6. The fishing lure of claim 2 wherein said framework is external said lure body.

7. A fishing lure comprising;
   a lure body having a front end, a rear end, a longitudinal axis, and a bore generally transverse to said longitudinal axis rearward of said front end;
   a framework member generally parallel to said longitudinal axis of said lure body, said framework member including a line connection means;
   a shaft connected to said framework member, said line connection means extending forward of said shaft, and said shaft pivotably inserted in said bore rearward of said lure body front end, a weight member attached to said shaft;

an action producing means comprising a bib attached to said lure body forward of said lure body bore. and a fish hooking means connected to said fishing lure; whereby said lure wobbles in an oscillating action when drawn through a body of water, said wobble action caused by a reaction force of water on said action producing means which causes the lure body to pivot about said shaft, and said water reaction force alternately acting on said lure body rearward of said bore causing said body to re-align with the direction in which the lure is being drawn through the water, and said weight member stabilizing said framework member from longitudinal rotation and lateral movement when said lure is drawn through the water.

8. The fishing lure of claim 7 wherein said weight member is fixably attached to said shaft external said lure body.

9. The fishing lure of claim 7 wherein said weight is recessed in said lure body, and pivotally attached to said shaft.

10. The fishing lure of claim 7 wherein said fish hooking mean is attached to said framework rearward of said lure body rear end.

11. The fishing lure of claim 7 including a movement limiting means for limiting the movement of said lure body with respect to said framework member.

12. The fishing lure of claim 7 wherein said framework is external said lure body.

* * * * *